United States Patent [19]

Urbani

[11] 4,071,943
[45] Feb. 7, 1978

[54] WAX CONTAINER MATERIAL

[76] Inventor: Larry E. Urbani, Van Cleave, Miss. 39564

[21] Appl. No.: 719,360

[22] Filed: Sept. 1, 1976

[51] Int. Cl.$^2$ ............................................. C08L 91/00
[52] U.S. Cl. ...................................... 29/525; 215/295; 215/1 C; 260/28.5 A
[58] Field of Search ............... 220/DIG. 30; 215/1 C, 215/321, 341, 295; 29/525; 260/DIG. 43, 28.5 A, 28.5 AV, 23 AR

[56] References Cited

U.S. PATENT DOCUMENTS

| | | |
|---|---|---|
| 3,518,803 | 7/1970 | Wunderlich et al. ............ 215/1 C X |
| 3,536,500 | 10/1970 | Cleerman et al. ................ 215/1 C X |
| 3,647,111 | 3/1972 | Stager et al. ................ 260/DIG. 43 |
| 3,996,176 | 12/1976 | Lorenian et al. ................ 260/28.5 A |

*Primary Examiner*—Milton S. Mehr
*Attorney, Agent, or Firm*—LeBlanc & Shur

[57] ABSTRACT

A novel method for containing materials in a container material adaptable to a wide variety of different materials including food products and household chemical products is described. The material utilized is intended to be a substitute for glass, plastic or metal containers, and comprises a resin hardened petroleum wax molded to form the container.

4 Claims, 6 Drawing Figures

U.S. Patent  Feb. 7, 1978  4,071,943
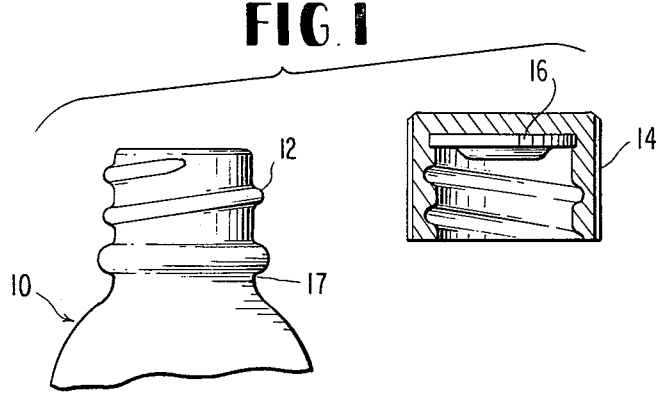
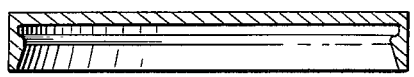
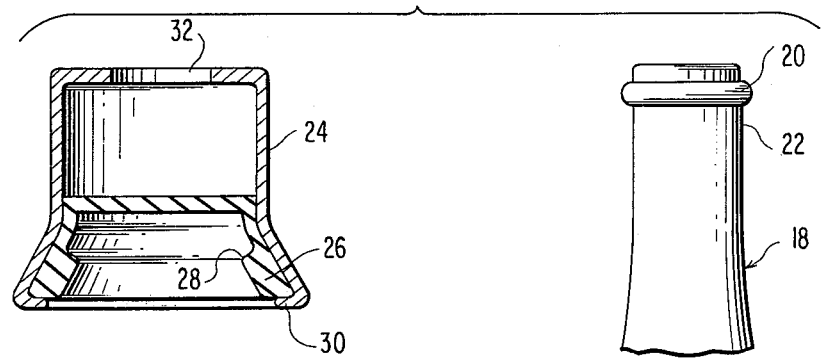
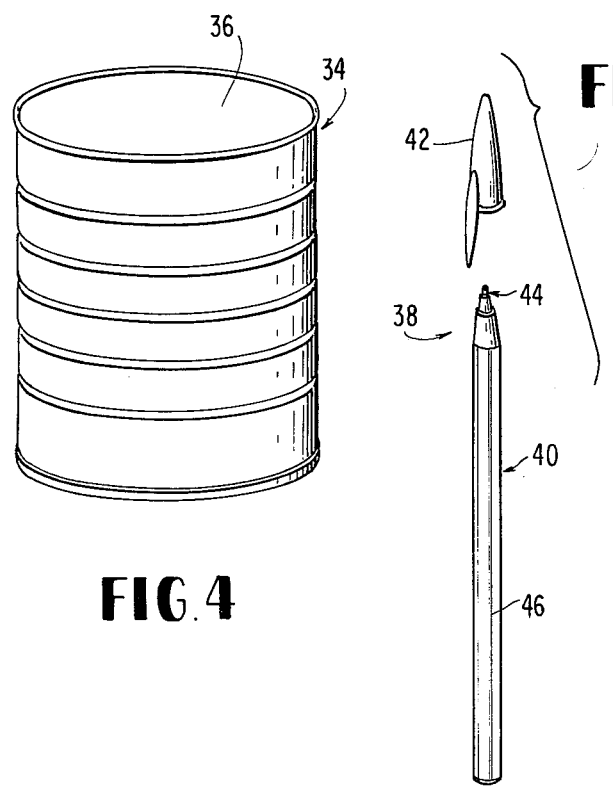
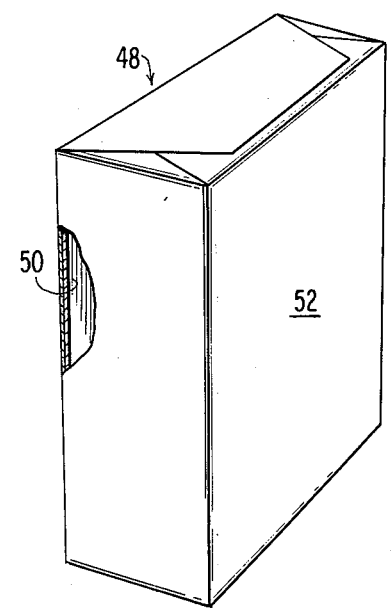

WAX CONTAINER MATERIAL

Solid waste management has become an increasing problem in recent years, and in many urban areas the problems associated with solid waste disposal have become nearly insurmountable. In many cities, major disposal problems are created by glass, plastic or metal containers used for a wide variety of household and consumer items. These containers, for the most part, do not biodegrade in a landfill and, with the exception of plastic, do not incinerate.

Attempts have been made to dispose of discarded containers by recycling. However, many containers are not susceptible to recycling and even in the case of, for example, aluminum cans, the expense of collection, compacting and transporting to the factory renders recycling operation, at best, only marginally profitable. In addition, various attempts have been made to develop biodegradable containers which will self-destruct in sunlight or under conditions present in a landfill. However, attempts to develop this type of container have not produced a marketable product. Many types exhibit undesirable side effects, such as contamination of the contents, unacceptable odor, or unacceptably short shelf life. Most proposed types of self-destructing packaging material are also very expensive.

It has not been discovered, however, that a wide variety of containers for food products, beverages, cosmetics, medicines, household detergents, and the like, may be formulated from a petroleum wax material. The container thus formed may be molded in any desired shape, and has proven to be resistant to a wide variety of different chemicals in tests extending over periods of time in excess of 16 months. The material also may be modified depending upon the use intended, to provide a variety of different types of containers from brittle to relatively resilient constructions. Shelf life could extend indefinitely.

The container material of this invention is a petroleum derivative wax, paraffin or microcrystalline, admixed with a compatible synthetic resin, preferably ethylene-vinyl acetate. The combination may include a plasticizer such as vegetable oil or acetic acid. The resin functions in the wax to increase the wear-resistant characteristics of the resulting container. A higher concentration of resin produces a more brittle and more wear-resistant product. The resin will normally be present in about 10% by weight of the total composition. The resin could be present in from 1 to greater than 20% or more, as desired.

The material may be reused, melted down and reformed as, for example, for home crafts, after emptying containers formed therefrom.

Information concerning such crafts is available through Bluff Creek Wax Works, Ltd., Van Cleave, Miss.

Because of the high melting point (175° F), containers will not melt or degrade under ambient conditions of temperature or pressure. Upon severe impact, however, containers will fracture, although without forming sharp edges and may be pulverized. Containers of this invention, however, are not sufficiently brittle to shatter or form sharp-edged projectiles and therefor will not injure users if broken.

A preferred resin containing wax is available commercially from Standard Oil Company of California, 575 Market Street, San Francisco, California 94105 under the trade name Chevron Coat 525, a "hot melting coating."

In the alternative, the material may be formulated from high melting point paraffin wax (160°–165° F) or microcrystalline wax blended with up to about 10% resin. The resin may be polyethylene, ethylene-vinyl acetate, polypropylene or any other compatible polymer. Polymers and both paraffin and microcrystalline waxes are available commercially from a wide variety of chemical companies. In addition, vegetable oil, mineral oil, or the like may be added as a plasticizer to provide a more resilient product as would be obvious to those skilled in the art.

Accordingly, it is an object of this invention to provide a new method of packaging in a container which is readily disposable either by burning or under the conditions of heat (normally 210° F) and pressure normally present in a sanitary landfill.

It is yet another object to provide a container means which is inert to a wide variety of materials which could be packaged therein, but which is readily disposable through incineration or conventional waste management techniques.

It is still another object to provide a means for containing beverages, food products, cosmetics, household chemicals, and the like which will retain said materials without degrading until said materials are used, and which will subsequently be disposable through incineration or conventional disposable techniques.

It is a further object to provide a container molded from a hardened wax material which is both sterile and fracture-resistant in the form of a can, jar, or bottle, no elements of which will resist conventional incineration techniques.

These and other objects will become readily apparent with reference to the drawings and following description, wherein:

FIG. 1 is a composite of a bottle constructed according to this invention consisting of a fragmentary view of the bottle neck together with a view of a typical lid in cross section.

FIG. 2 is a cross-sectional view of a jar lid constructed according to the process of this invention.

FIG. 3 is a composite view showing a bottle stopper constructed according to this invention in cross section, and a fragmentary view of a bottle neck adapted to receive said stopper.

FIG. 4 depicts a cylindrical container constructed according to this invention.

FIG. 5 is a composite view showing a pencil and cap constructed according to this invention; and FIG. 6 depicts a container in partial cross section constructed according to this invention.

This invention comprises the discovery that molded containers made from a blend of a resin such as ethylene-vinyl acetate, polyethylene, polypropylene, or similar equivalent resins compatible with normal alkanes, with paraffin or other petroleum waxes, may be substituted for conventional packaging materials. This invention also comprises providing a disposable packaging material which can be substituted for conventional materials which are not disposable.

The procedures for molding the containers of this invention are well-known and obvious to those skilled in the art. This application is not intended to be limited to a specific type of molding procedure, and it is intended that any compatible procedure could be used.

The process of this invention is intended to be utilized with a wide variety of different types of packaging. Bottles, closed cylinders, rectangular packages, open containers for beverage cans or bottles, flower pots and decanters may all be formulated according to the process of this invention with the above resin-wax blend. In addition, writing implements such as ball point pens or ordinary lead pencils may be formulated according to this invention. In the case of a pen, the normally plastic or metal body used to contain the writing fluid may be molded from the hardened wax of this invention. In the case of a pencil, it is anticipated that the normally wooden portion which contains the writing lead could be of the resin wax of this invention.

The following are then merely representative examples of formulation according to this invention.

With reference to FIG. 1, a bottle 10 is depicted having threads 12 molded therein for attachment of a cap 14. Both the cap 14 and the bottle may be molded from the resin wax from this invention. In addition, a rubber or deformable plastic washer 16 may be disposed within the cap 14 to provide a seal when the cap is placed on the bottle. It will be obvious to those skilled in the art that the cap 14, if desired, could be formulated out of plastic, metal or a metal shell (not shown) could surround the cap for additional protection and to provide a gripping surface for ease in opening.

Most importantly, however, the wax material of this invention containing the resin is sufficiently abrasive-resistant to permit threading a cap of the same material thereon without deformation.

The bottle 10 could have a score line 17 formed therein to permit opening by fracturing along the score line. Such a container could then be opened without removing the cap, as by impact, cutting, or biting.

In the alternative, FIG. 2 depicts a jar cap or bottle cap which may be press-fitted onto a container (not shown).

With reference to FIG. 3, bottle 18 formulated of the resin-wax material of this invention may have a metal ring 20 press-fitted on the neck 22 for cap retention as an alternative to the use of threads. Cap 24 also formulated of the resin-wax of this invention may be equipped with an internal ring 26 having a retaining lip 28 adapted to receive ring 20. Fitting 26 may be constructed of rubber, plastic or the like and is retained by the retaining lip 30 disposed thereunder. If desired, an opening 32 may be provided in the upper portion of cap 24 for insertion of a finger to facilitate removal of the cap from the bottle 18.

FIG. 4 illustrates a cylindrical container 34 similar to an ordinary can. The container, however, is entirely molded of the resin wax of this invention, and the cap portion 36 may be press-fitted or heat-sealed, if the contents permit, in a conventional manner.

With reference to FIG. 5, a writing implement 38 is pictured consisting of the stylus portion 40 and a cap portion 42. The stylus portion may simulate a conventional ball point pen having a metal point assembly 44 and a barrel 46 containing the ink reservoir formulated from the resin-wax of this invention utilized to contain the writing fluid. In the alternative, barrel portion 46 may be used to contain a graphite lead and the barrel portion utilized in substitution for the wooden portion of an ordinary writing pencil. The wax of this invention is susceptible to sharpening in a common pencil sharpener, and accordingly such a wax pencil would be used in the manner equivalent to the manner of using an ordinary wooden pencil.

With reference to FIG. 6, a molded box 48 may be formed with a resin-wax inner container 50 surrounded by a decorative paper wrapping 52. Wrapping 52 may have any appropriate indicia stencilled or printed thereon.

In addition to conventional paper or wax-paper labels and the like which may be utilized with the containers of this invention, ordinary dyed paraffin wax may be used to paint appropriate designs on the containers as desired. In addition, the container material comprising a wax and resin blend includes the plasticizing oil, but may also include a conventional dye for achieving any desired aesthetic feature. The dye would be added, in a conventional manner similar to that utilized in candle-making, to the molten material before it is molded.

The resin-wax blend of this invention has a melting point of about 175° F and a pour point of about 200° F. Accordingly, the wax material will be maintained at a temperature high enough for sterilization before molding and if the molding process is carried out in a sterile environment, molded containers may be easily formulated for packaging medicines or food products.

As indicated above, the quantity of oil utilized will determine the rigidity of the molded structure, and with use of the lesser quantity of oil it will be possible to formulate for example a bottle that will shatter upon impact. In the alternative, the normal wax utilized, such as Chevron Coat 525 obtained from Standard Oil Company, is sufficiently resilient to provide a relatively unbreakable container.

Containers formulated according to the process of this invention have been tested containing water, ketchup, vinegar, alcohol, gasoline, acetone, ammonia, bleach, cannister sets, coffee, liquid and solid soap products, syrup, hairspray and many other household items. In over 16 months of testing, no change in taste, color, or odor has been detected in the materials contained except that the wax container has, in the instance of ketchup, acquired an interior red coating.

In summary then, this invention comprises a method for packaging materials wherein said materials are disposed within a package that is readily disposable in an incinerator or in a sanitary landfill. The material will completely combust at the normal incineration temperatures. In a sanitary landfill, the pressure and heat from packing will ultimately cause the degredation of the wax-resin container. However, in normal usage and storage, the container of this invention will resist abrasion and contain a wide variety of different materials without affecting the taste or color thereof for desired periods of time.

The material utilized as described above is a blend of a paraffin, microcrystalline, or similar petroleum derivative wax with preferably 10% of a resin compatible therewith such as ethylene-vinyl acetate, polyethylene, polypropylene, and the like from 1 to at least 20% or more could be used, as desired.

The containers of this invention are molded and formed by conventional techniques and may be decorated with a dyed, thinned wax, or with conventional paper or equivalent labels.

Finally, containers of this invention may have special purpose metal or plastic gaskets, retaining rings or the like, in order to facilitate sealing or in order to resist access thereto.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced herein.

What is claimed and desired to be secured by United States Letters Patent is:

1. A process for providing an abrasion resistant, disposable container for materials comprising the steps of providing a petroleum wax having a melting point of at least about 160° F., heating said wax above its melting point and blending therewith a resin polymer selected from the group consisting of ethylene-vinyl acetate, polyethylene, and polypropylene, said polymer being present in a concentration of no more than about 10% of said blend; molding said blend to form said container.

2. The process of claim 1 wherein said blend further comprises a plasticizer.

3. The process of claim 1 wherein said polymer is present in a concentration of about 10% of said blend.

4. The process of claim 1 wherein said container is a bottle, said process further comprising:
providing a metal retaining ring; mounting said ring on the neck of said bottle adjacent the opening therein; providing a stopper therefor having a resilient, depending shirt portion adapted to fit over said ring and thereby retain said stopper on said bottle opening.

* * * * *